US006107588A

United States Patent [19]

De Leo et al.

[11] Patent Number: 6,107,588

[45] Date of Patent: Aug. 22, 2000

[54] METHOD OF SORTING POSTAL OBJECTS

[75] Inventors: Guido De Leo; Nedo Gennari, both of Genoa, Italy

[73] Assignee: Elsag SpA, Italy

[21] Appl. No.: 09/192,054

[22] Filed: Nov. 13, 1998

[30] Foreign Application Priority Data

Nov. 14, 1997 [IT] Italy ................................ TO97A1003

[51] Int. Cl.$^7$ ................................ B07C 5/00; G06K 9/00

[52] U.S. Cl. .......................... 209/584; 209/900; 209/583

[58] Field of Search .................................... 209/584, 583, 209/145, 900, 577

[56] References Cited

U.S. PATENT DOCUMENTS

| | | | |
|---|---|---|---|
| 3,889,811 | 6/1975 | Yoshimura | 209/74 |
| 4,140,627 | 2/1979 | Weller et al. | 209/584 |
| 4,247,008 | 1/1981 | Dobbs | 209/584 |
| 4,388,994 | 6/1983 | Suda et al. | 209/564 |
| 4,601,396 | 7/1986 | Pavie | 209/584 |
| 4,615,446 | 10/1986 | Pavie . | |
| 5,009,321 | 4/1991 | Keough | 209/584 |
| 5,421,464 | 6/1995 | Gillmann et al. | 209/584 |
| 5,433,525 | 7/1995 | Levaro et al. | 209/584 |
| 5,518,122 | 5/1996 | Tilles et al. | 209/539 |
| 5,667,078 | 9/1997 | Walach | 209/584 |
| 5,810,174 | 9/1998 | Hamada et al. | 209/584 |
| 5,924,576 | 7/1999 | Steenge | 209/584 |
| 5,977,501 | 11/1999 | Werkheiser et al. | 209/583 |

FOREIGN PATENT DOCUMENTS

| | | | |
|---|---|---|---|
| 000566456 | 10/1993 | European Pat. Off. | 209/584 |
| 000575032 A2 | 12/1993 | European Pat. Off. | 209/584 |
| 0 697 260 A1 | 8/1994 | European Pat. Off. . | |
| 196 29 125 A1 | 1/1998 | Germany . | |
| 406000452 | 1/1994 | Japan | 209/584 |

*Primary Examiner*—Donald P. Walsh
*Assistant Examiner*—David A Jones
*Attorney, Agent, or Firm*—Douglas J. Christenser

[57] ABSTRACT

Method of sorting postal objects in which a postal sorting machine has a first input and at least one second input and a plurality of outputs communicating with the inputs via a sorter device. The method comprises the steps of: supplying first and second streams of postal objects to the first and second inputs, directing the postal objects to all the outputs; withdrawing from at least some of the outputs groups of postal objects previously directed to respective outputs forming two collections of groups of postal objects; and operating in a transport mode which each postal object supplied to the first input is directed only towards a first subset of the outputs and each postal object supplied to the second input is directed only towards the second subset of the said output. During the said transport mode the groups of postal objects belonging to a respective collection are supplied respectively to the first and second input.

9 Claims, 3 Drawing Sheets

1
A
B
F1
F2
Fi
7
10a
12a
14a
10b
12b
14b
17
22
20
T
U1
U2
U3
U4
Ui
UN
(POPab)
(R1a)
(R1b)
(R2a)
(R2b)
(R4b)
Wa
Wb
Ca
Cb

METHOD OF SORTING POSTAL OBJECTS

BACKGROUND OF THE INVENTION

The present invention relates to a method of sorting postal objects.

Postal sorting machines are known for receiving an input stream of postal objects disposed in an entirely random manner and acting to generate at their output a sorted stream of postal objects, that is to say a stream of postal objects disposed in a predetermined progressive order able to allow the sequential delivery of such post objects by a postman travelling along a predefined route. The progressive order generally comprises a sequence of adjacent addresses corresponding to street numbers or to groups of street numbers of buildings disposed along the route along such postal objects must be delivered.

Known postal sorting machines generally comprise an input (also called induction) able to receive a set of postal objects to be sorted, a plurality of outputs associated with respective containers into which groups of postal objects can be discharged, and a conveying and directing system (sorter) interposed between the input and the output and controlled by an electronic processing unit which is able to direct each object towards a respective output on the basis of a code impressed on the object itself.

The sorting operation is achieved by such machines by performing a plurality of recursive cycles by means of which groups of objects already subjected to preliminary sorting operations are reintroduced into the input and directed towards outputs associated with containers into which the objects deposited in a preceding working cycle have been left.

At the end of such recursive cycles groups of postal objects are taken from the machine disposed in a predetermined progressive order which allows the sequential distribution of such postal objects by a postman travelling along a subsection of a predetermined route.

There are also postal machines which have two (or more) inputs which communicate with a single conveyor system for sorting which is operable to direct the postal objects towards a first set of outputs associated with the first input and a second set of outputs associated with the second input. Each input of the postal machine cannot utilise outputs in common with the other inputs; in this way, although the conveyor system is shared, such postal devices comprise in reality several independent postal sorting machines separate from one another.

The known sorting machines provided with two (or more) inputs are able to function with streams of postal objects which have already been subject to a preliminary working cycle; this preliminary working cycle necessitating a discrimination on the basis of which groups of postal objects having common characteristics are formed, each group then being supplied to a respective input.

SUMMARY OF THE INVENTION

The object of the present invention is to provide a postal sorting method operating with a machine provided with two (or more) inputs which allows the sorting operations to be effected in a particularly effective manner and in reduced times.

A further object of the present invention is to provide a postal sorting method operating with a machine provided with two (or more) inputs which does not necessitate the said discrimination in a preliminary working phase.

The preceding object is achieved by the present invention in that it relates to a method of sorting postal objects as defined in claim 1.

BRIEF DESCRIPTION OF THE DRAWINGS

The invention will now be described with reference to the attached drawings which illustrate a non-limitative example thereof, in which.

DETAILED DESCRIPTION OF THE INVENTION

Figures 1A, 1B:
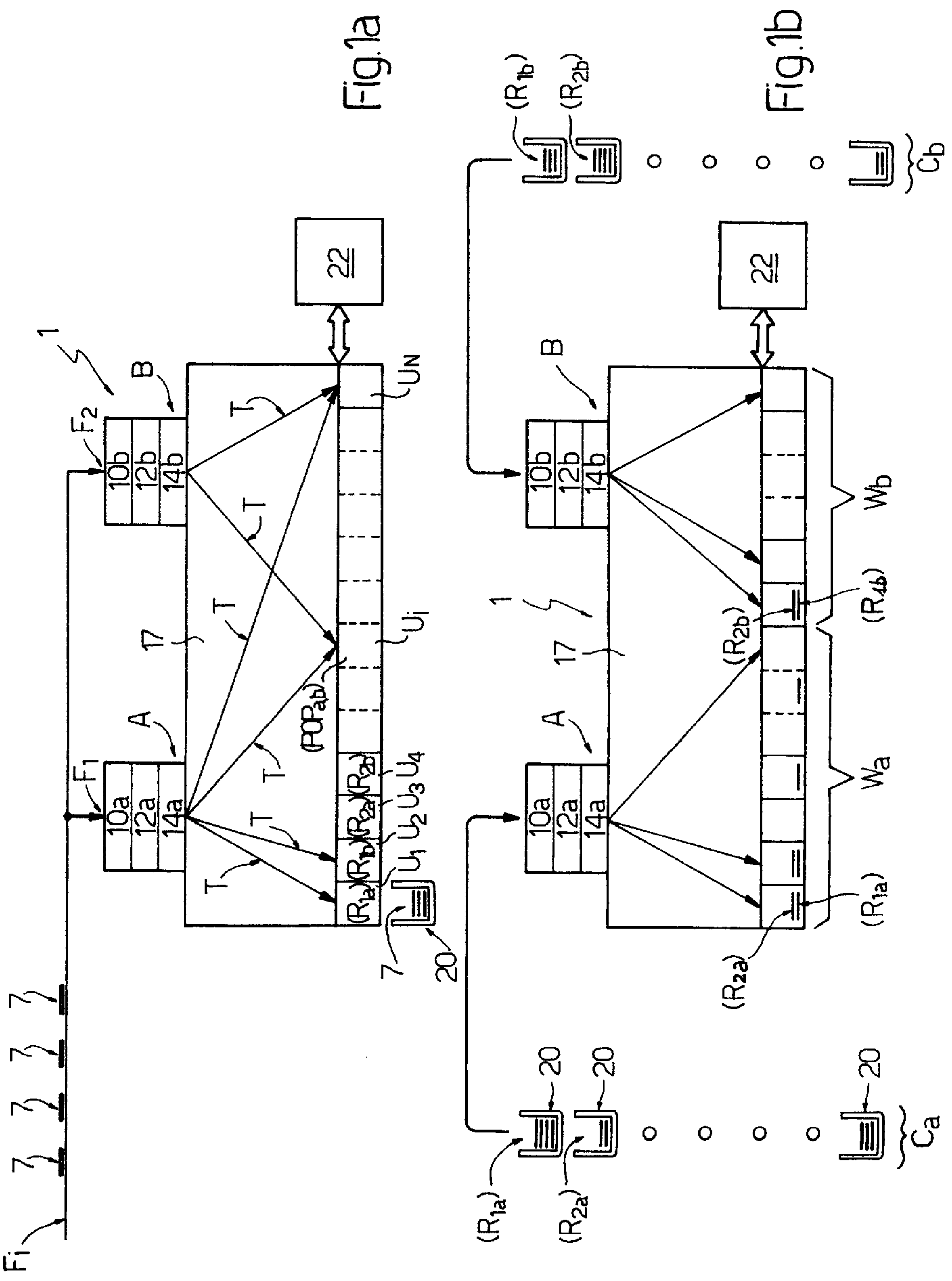
FIG. 1*a* is a schematic representation of a machine for sorting postal objects operating according to a first phase of the method of the present invention.
FIG. 1*b* is a schematic representation of a machine for sorting postal objects operating according to a second phase of the method of the present invention.

In FIGS. 1*a* and 1*b* a machine for sorting postal objects, formed according to the principles of the present invention is generally indicated 1. The machine 1 has a first input A (also called first induction) capable of receiving a first stream F1 of postal objects 7 (letters, cards, documents in envelopes or generally flat documents of rectangular form) and a second input B (also called second induction) capable of receiving a second stream F2 of postal objects 7. First and second streams F1 and F2 of postal objects are conveyed by conveyor devices of known type (for example of belt type) capable of providing each of the inputs A and B with a set of postal objects disposed in sequence (for example stacked). Conveniently the first and the second stream of postal objects are formed by subdivision of a single stream Fi (input stream) of postal objects and which comprises 50% of the input stream. It is however clear that the subdivision of the stream Fi into the streams F1 and F2 could also be effected with unequal divisions. The stream Fi comprises a plurality of postal objects onto which there has already been impressed a code (for example a bar code) able to identify the destination of the postal object itself; such objects are however disposed in a random sequence, that is to say no progressive order nor any relationship exists between the arrangement of the postal objects and the progressive order according to which they will be subsequently delivered.

Each input A, B is associated with a separator device 10*a*, 10*b* (shown schematically) for the separation of postal objects 7 from the stream F1 and F2 and arrangement of each object in a spaced position with respect to the other postal objects in the stream, a reading device 12*a*, 12*b* (shown schematically) receiving the postal objects coming from the separator device and operable to read the code associated with the object itself, and a delay module 14*a*, 14*b* (shown schematically) receiving at its input the postal objects coming from the reading device 12*a*, 12*b*. The output of the delay module 14*a*, 14*b* communicates with a conveyor and director device (sorter) 17 within the machine 1 operable to convey the postal objects from the inputs A, B towards a plurality (N) of separate outputs U1, U2, U3 . . . Ui, . . . , Un at which the postal objects can be held. Conveniently each output U1 U2 U3 . . . Un is associated with a removable container 20 (shown schematically) in which the postal objects 7 delivered to the output can be held. According to the present invention the machine 1 is controlled by an electronic unit 22 of programmable type which controls a new mode of operation of the conveyor and directing device 17 (sorter) and of the whole of machine 1.

Figure 2:
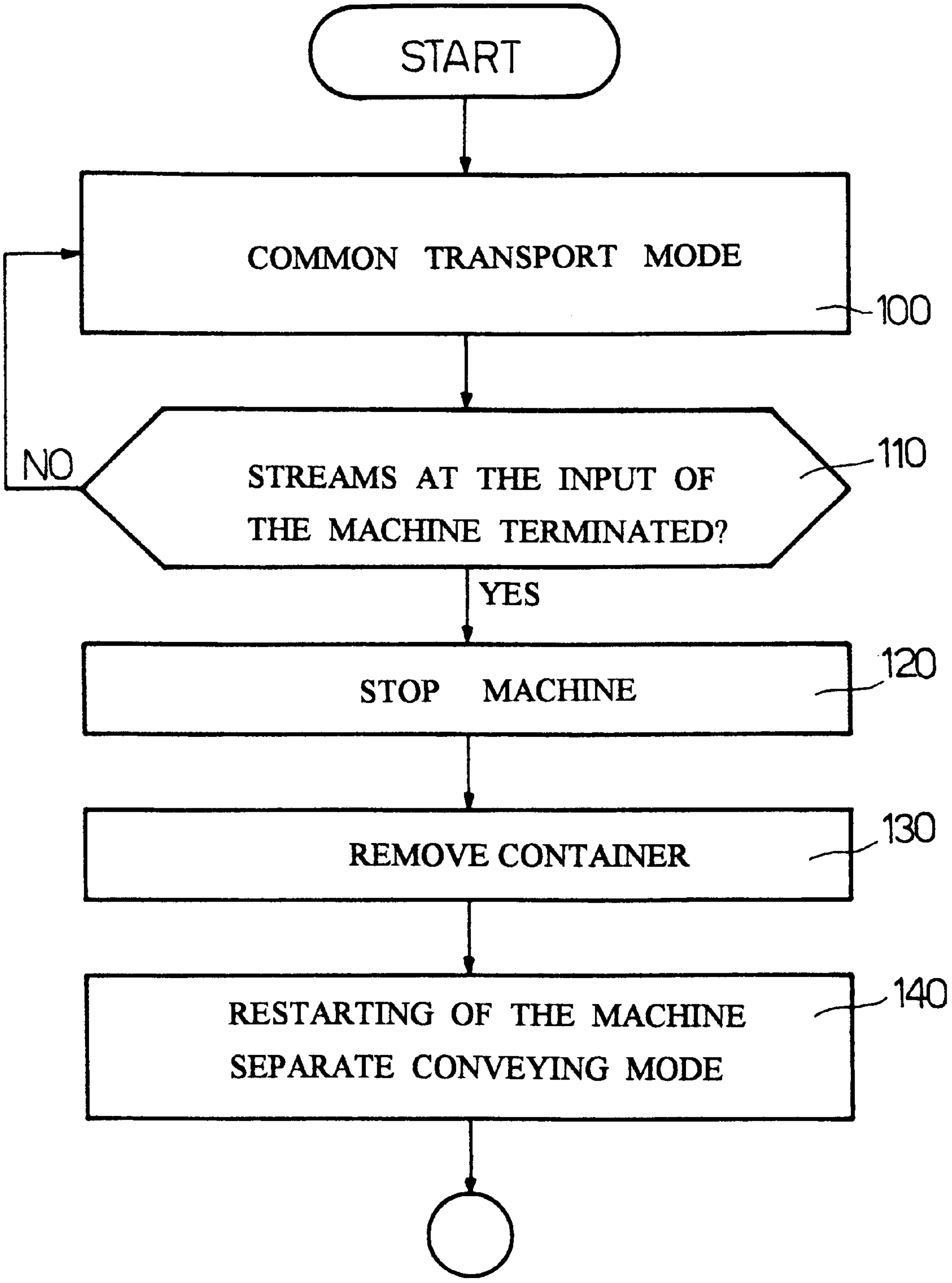
FIG. 2 is a logic block diagram illustrating the operations of the method according to the present invention.

In a first phase of operation of the machine 1 (FIG. 2) according to the present invention, initially (block 100 after a starting block) the first stream F1 supplied to the input A is directed to all the N outputs of the machine (FIG. 1*a*), that is to say the sorter device 17, under the control of the electronic unit 22, operates a common transport mode according to which each postal object 7 supplied to the first input A can potentially be delivered to any of the N outputs. In parallel to this and contemporaneously the second stream F2 (FIG. 1*a*) supplied to the second input B is directed to the N output of the machine, that is to say the sorter device 7, under the control of the electronic unit 22, operates in a common conveyor mode according to which each postal object 7 supplied to the input B can be potentially delivered to any of the N outputs. From this it follows that each of the N outputs can potentially receive objects coming from both the input A and the input B. The movement of the postal objects through the sorter device 17, that is to say the path T followed by a postal object within the sorter device 17 from an input A, B to a general output Ui is determined by the code present on the postal object 7 read by the reading device 12*a*, 12*b*. To this end, the electronic unit 22 can conveniently be provided with a plurality of look up tables (not illustrated) receiving (for example from the reading devices 12*a*, 12*b*) input data associated with the codes impressed on each postal object 7 and supplying a set of output data which identifies the selected output Ui towards which this postal object must be directed. The output data are transmitted to the machine 1 which is provided with interface means (not shown) able to convert the output data from the table (not shown) into electrical control signals usable for the control of actuator members, for example selector guides, transmission members etc. (not shown) which together form the path T within the conveyor device 17 which guides the postal object towards the selected output Ui.

Figure 3:
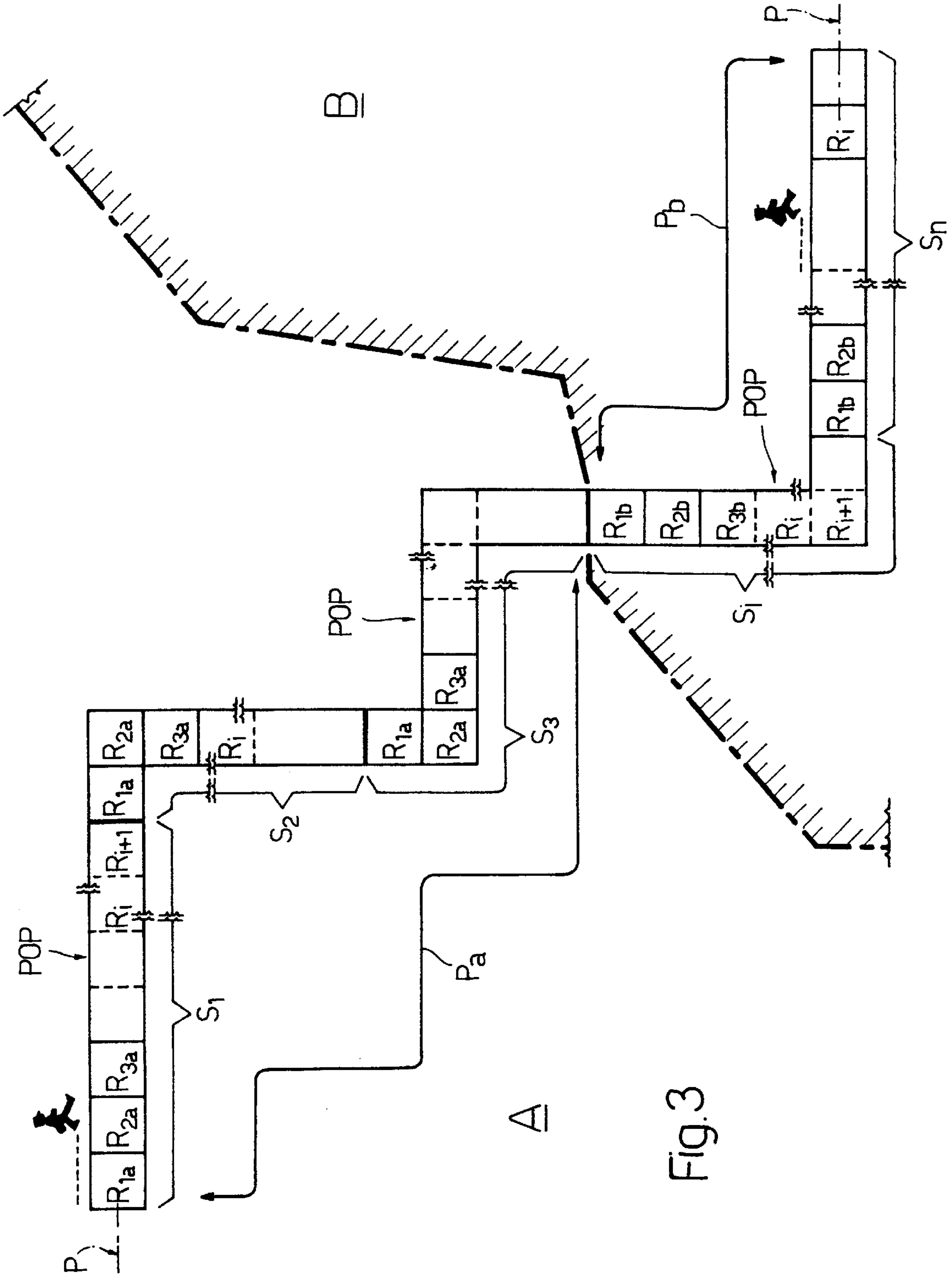
FIG. 3 schematically represents a distribution path of postal objects sorted according to the method of the present invention.

In particular it is known that (FIG. 3) a set of contiguous and successive streets, squares and/or other places of a city or any type of inhabited place define a continuous route P for the delivery of postal objects. This continuous route is sub-dividable into a plurality of successive adjacent subsections S1, S2, . . . Si, . . . Sn. Each subsection Si comprises a plurality of addresses Ri corresponding to street numbers or to groups of street numbers of buildings disposed along the subsection Si. Successive adjacent addresses Ri, Ri+1 of each subsection Si correspond to physical places in which the postal objects carried by a postman who moves continuously along the section Si are delivered in succession for which the postman removes such objects in sequence from a sorted stack of postal objects.

The continuous route P can, moreover, be subdivided into two (or more) adjacent sub-routes Pa and Pb each of which comprises several adjacent sections Si and runs within a respective zone (zone A, zone B etc.) of the city or generic place through which the route P passes. In particular, the number of sub-routes Pi into which the route P can be subdivided is conveniently equal to the number of inputs of the postal machine as will become clear from the subsequent description. In the illustrated example two sub-routes are described in that the illustrated embodiment of the machine 1 has two inputs.

The sorter device 17 (operating under the control of the electronic unit 22) is able to deposit in a respective output (or a set of outputs) of the machine 1 all the postal objects which have the same position in the ordered progression POP along a respective subsection Si belonging to a respective sub-route. In this way, by way of non-limitative example, the first output U1 can contain all the objects which are to be delivered in the first address R1*a* of the subsection Si of the sub-route Pa, second output U2 can contain all the objects which are to be delivered to the first delivery address R1*b* of the subsections Si of the subroute Pb, the third output U3 can contain all the objects which are to be delivered to the second delivery address R2*a* of the subsections Si of the sub-route Pa, the forth output U4 can contain all of the objects which are to be delivered to the second delivery address to R2*b* of the subsections Si of the sub-route Pb.

Generally the electronic unit 22 commands a mode of transport of the device 17 according to which, to an output Ui are delivered all the objects which are to be delivered to a delivery address having a predetermined position in the ordered progression POPa,b along all the subsections belonging to a respective sub-route (Pa or Pb in the example).

The block 100 is followed by a block 110 which tests if the streams F1 and F2 at the input of the machine 1 have terminated; in the negative case it returns to block 100, otherwise it passes to a block 120 which temporarily stops the operation of the machine 1. The stop operation described here is introduced for simplicity of description; it is however clear that the extraction operation described hereinafter could also be operated with the machine 1 in motion.

Subsequently (block 130 after block 120) at least some of the containers 20 are removed by manual operation or automatic intervention of a robot (not illustrated) operating under the control of the control unit 22, each container 20 containing the stacked postal objects directed to a respective output. For simplicity of description it is supposed that all the containers 20 are removed from the postal machine 1.

The various containers are moreover removed by the machine 1 according to a precise order and with a subdivision by sub-routes, that is to say the containers are removed by forming two collections of groups of postal objects Ca and Cb each of which is related to a respective sub-route; for each collection of postal objects the various groups are withdrawn according to the number of successive positions in the ordered progression POP contained in the subsections Si. For example, the container 20 corresponding to the output U1 and containing the group of postal objects comprising the articles which the postman must deliver to the first delivery address of the various subsections Si of the sub-route Pa will be removed first; subsequently, the container 20 corresponding to the output U3 containing the group of postal objects formed by the articles which the postman must deliver to the second delivery address of the subsections Si of the route Pa will then be removed, and so on.

Simultaneously or subsequently to the above-mentioned operations the container 20 corresponding to the output U2 and containing the group of postal objects comprising the articles which the postman must deliver to the first delivery address of the various subsections Si of the sub-route Pb will be removed, and then the container 20 corresponding to the output U4 containing the group of postal objects formed by the articles which the postman must deliver to the second delivery address of the subsections Si of the route Pb will be removed and so on.

There are thus formed two collections Ca and Cb of groups of postal objects: the collection Ca relating to the sub-route Pa and containing the groups of postal objects subdivided by delivery positions along the subsections Si and the collection Cb of groups of postal objects relating to the sub-route Pb and containing the groups of postal objects subdivided by delivery positions along the subsections Si.

When the machine has been emptied, that is to say when both the collections Ca and Cb have been removed from the machine, new (empty) containers are fitted to the machine itself. The block 130 is now followed by a block 140 which commands the restarting of the machine 1; according to the operations governed by this block, the electronic unit 22 commands a mode of operation of the sorter device 17 according to which each postal object 7 supplied to the first input A (FIG. 1*b*) can only be directed towards a first subset Wa of the N outputs. Parallel to this a postal object supplied to the second input B (FIG. 1*b*) is directed towards a second subset Wb of the N outputs of the machine, with the subset Wb not having elements common to the subset Wa. In other words, the sorter device 17, under the control of the electronic unit 22, operates according to a "separate" conveying mode according to which each postal object 7 supplied to the input A can be directed only towards the outputs of the subset Wa and each postal object 7 supplied to the input B can be directed only towards the outputs of the subset Wb. From this it follows that each of the N outputs cannot receive objects coming from both the input A and the input B.

In particular, the groups of postal objects belonging to the above mentioned first collection Ca (relating to the sub-route Pa) are supplied to the first input A whilst the groups of postal objects belonging to the collection Cb (relating to the sub-route Pb) are supplied to the second input B.

In this way the objects contained in the removed container containing the postal objects which are to be delivered by the postman to the first delivery address Ri of the various subsections Si of the sub-route Pa are supplied to the first input of the machine 1 and are delivered to the output belonging to the subset Wa; within each container associated with an output of the first subset Wa there is formed a first layer of postal objects the first layer relating to objects which are to be delivered by the postman at a first delivery address of a respective subsection Si of the sub-route Pa.

Subsequently the postal objects contained in the second container containing the postal objects to be delivered by the postman at the second delivery address R2 of the various subsections Si of the route Pa are supplied to the first input of the machine 1 and the above-mentioned operations are repeated. In this way, within each container associated with an output of the first subset Wa there is formed a second layer of postal objects superimposed on the first; the second layer comprising objects to be delivered by the postman at a second delivery address of a respective subsection Si of the subroute Pa.

These operations are repeated until a final container of the collection Ca is supplied to the input A and a final layer of postal objects is formed; this final layer being objects to be delivered to a final delivery address of a respective subsection Si of the sub-route Pa. In this way each container of the subset Wa can contain a stack of postal objects disposed in order by delivery address and relating, for example, to a subsection Si of the sub-route Pa. These postal objects are now disposed in the order of manual delivery which will then be followed by a postman moving along a subsection Si of the sub-route Pa.

Similarly, the objects contained in the first container containing the postal objects to be delivered by the postman at the first delivery address Ri of the various subsections Si of the sub-route Pb are supplied to the second input B of the machine 1 and are delivered to the output belonging to the subset Wb; within each container associated with an output of the second subset Wb there is formed a first layer of postal objects; the first layer being objects to be delivered by the postman at a first delivery address of a respective subsection Si of the sub-route Pb.

Subsequently the postal objects contained in the second container containing the postal objects to be delivered by the postman at the second delivery address R2 of the various subsections Si of the sub-route Pb are supplied to the second input B of the machine 1. In this way, within each container associated with an output of the second subset Wb there is formed a second layer of postal objects superimposed over the first; the second layer being objects to be delivered by the postman at a second delivery address of a respective subsection Si of the subroute Pb.

These operations are repeated until a final container of the collection Cb is supplied to the input B and a final layer of postal objects is formed; this final layer being objects intended to be delivered at a final delivery address of a respective subsection Si of the sub-route Pb. In this way each container can contain a stack of postal objects disposed in order by delivery address and relating, for example, to a subsection Si of the sub-route Pb. Such postal objects are already disposed in the order of manual delivery which will then be followed by a postman travelling along a subsection Si of the sub-route Pb.

The sorting method described above therefore comprises a set of phases comprising:

A) phases of supply of the first and second stream of postal objects while the sorter device operates in a "common" addressing mode;

B) a phase of clearing (emptying) the machine in which there are formed at least two collections of groups of postal objects; and C) phases of supply of groups of objects from each collection to a respective input whilst the sorter device operates in a separate address mode.

Altogether the method described performs the sorting operation with a reduced number of phases and therefore in a shorter time. The method described moreover operates with streams of postal objects (F1, F2) which have not been subjected to any previous sorting to divide them between the inputs (inductions) available; in this way the pre-treatment operations necessary to subject the post to sorting methods utilised in multiple-input sorting machines of known type are reduced.

What is claimed is:

1. A method of sorting postal objects with a postal sorting machine (1) having a first input (A) and at least a second input (B) and a plurality of outputs (U1, . . . Un) communicating with the said inputs (A, B) via a sorter device (17), the said method being characterized in that it comprises the steps of:

supplying a first stream (F1) of postal objects to a first input (A) and simultaneously supplying a second stream (F2) of postal objects to the second input (B);

directing the said first stream (F1) to all the outputs (N) of the machine by operating the said sorter device (17) in a common mode of transport in which each postal object (7) supplied to the first input (A) can be directed to any of the outputs (N);

directing the said second stream (F2) to all the outputs (N) of the machine by operating the said sorter device (17) in a common mode of transport in which each postal object (7) supplied to the second input (B) can be directed to any of the outputs (N);

removing (130), from at least some of the said outputs, groups of postal objects previously directed to the respective outputs;

operating a separate transport mode according to which each previously removed postal object (7) supplied to the first input (A) is directed solely to a first subset (Wa) of the said outputs and each previously removed postal object (7) supplied to the second input (B) is directed solely towards a second subset (Wb) of the said outputs; said first subset (Wa) and the said second subset (Wb) being disjoint;

supplying at least one first group of previously removed postal objects to the said first input with the said separate transport mode active to form, in at least part of the outputs belonging to the first subset, a first arrangement of postal objects;

supplying a further group of previously removed postal objects to the said first input to form, in at least some of the outputs belonging to the first subset (Wa), a further arrangement of postal objects adjacent to the first arrangement; and repeating in a sequential manner a supply phase of groups of previously removed postal objects to the said first input (A) to form sets of sorted postal objects in at least some of the outputs belonging to the said first subset (Wa).

2. A method according to claim 1, comprising the further steps of:

supplying at least one first group of previously removed postal objects to the said second input with the said separate transport mode active, to form, a firs arrangement of postal objects in at least some of the outputs belonging to the second subset;

supplying a further group of previously removed postal objects to the said second input to form, in at least some of the output belonging to the second subset (Wb) a further arrangement of postal objects adjacent a first arrangement; and sequentially repeating the phases of supplying groups of previously removed postal objects to the said second input (B) to form sets of sorted postal objects in at least some of the said outputs belonging to the said second subset (Wb).

3. A method according to claim 1, in which the said phase of directing the said postal objects from the said inputs (A, B) to the said outputs comprises the phase of directing to a respective output (Ui) of the machine (1) the postal objects which have the same position in an ordered progression (POP) as a delivery address (Ri) disposed along a respective subsection (Si) belonging to a sub-route (Pa, Pb) for the delivery of postal objects; the said sub-route (Pa, Pb) being subdividable into a plurality of successive said adjacent subsections (S1, S2 . . . Si . . . Sn); each subsection (Si) comprising a plurality of delivery addresses (Ri) disposed along a subsection (Si) and able to receive postal objects in a delivery phase; successive adjacent sub-routes forming a total route for the delivery of all the post supplied to the said machine.

4. A method according to claim 3, in which the said phase (130) of removing the said postal objects comprises ordered removal phases according to which groups of postal objects are removed in succession; the successive order of removal of each group being established on the basis of the position in the ordered progression (POP) of the objects belonging to each group.

5. A method according to claim 4, in which at least two ordered removal phases are performed for the formation of at least two collections (Ca, Cb) of groups of postal objects each of which relates to a respective sub-route (Pa, Pb); each ordered removal phase comprising the removal in succession of groups of postal objects; the successive order of removal of each group belonging to a respective collection (Ca, Cb) being established on the basis of the position in the ordered progression (POP) of the objects in these groups belonging to respective sub-routes (Pa, Pb).

6. A method according to claim 4, in which the phase of supplying at least some of the said groups of previously removed postal objects in sequence to the said machine operating in the said separate transport mode comprises a step of supplying the said groups of postal objects in a sequence established on the basis of the number in the ordered progression (POP) of the object belonging to the group itself.

7. A method according to claim 5, in which the phase of supplying at least some of the said groups of previously removed postal objects in sequence to the said machine operating in the said separate transport mode comprises the step of supplying each collection (Ca, Cb) of groups of postal objects to a respective input (A, B); the groups of objects belonging to the same collection (Ca, Cb) being supplied to the associated input (A, B) in a sequence established on the basis of the number in the ordered progression (POP) of the objects belonging to the group itself.

8. A method according to claim 1, in which the said phase of directing the said postal objects from the said inputs to the said outputs comprises the step of controlling the path (T) travelled by a postal object along a conveyor device (17) from an input (A, B) towards a said output.

9. A method according to claim 1, in which the said phase of directing the said postal objects from the said inputs to the said outputs comprises the step (12*a*, 12*b*) of detecting a code present on the postal object itself and associating (22) with this code an identification of the output towards which the said postal object must be directed.

* * * * *

UNITED STATES PATENT AND TRADEMARK OFFICE
CERTIFICATE OF CORRECTION

PATENT NO. : 6,107,588
DATED : August 22, 2000
INVENTOR(S) : Guido De Leo and Nedo Gennari It is certified that error appears in the above-identified patent and that said Letters Patent is hereby corrected as shown below:

Title page,
Item [54], Title "METHOD OF SORTING POSTAL OBJECTS" should be
-- METHOD OF SORTING POSTAL OBJECTS --.

Column 1,
Line 11, "post" should be -- postal --.
Line 44, "utilise" should be -- utilize --.

Column 7,
Line 34, "firs" should be -- first --.

Signed and Sealed this

Twenty-eighth Day of May, 2002

*Attest:*

JAMES E. ROGAN

*Attesting Officer* *Director of the United States Patent and Trademark Office*